(12) United States Patent  (10) Patent No.: US 8,260,082 B2
Rhoda et al.  (45) Date of Patent: Sep. 4, 2012

(54) PET EYE CORRECTION

(75) Inventors: David K. Rhoda, Rochester, NY (US);
Andrew T. Cooper, Fairport, NY (US);
Thomas J. Murray, Cohocton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/275,631

(22) Filed: Oct. 18, 2011

(65) Prior Publication Data
US 2012/0033883 A1  Feb. 9, 2012

Related U.S. Application Data

(62) Division of application No. 11/971,988, filed on Jan. 10, 2008, now abandoned.

(60) Provisional application No. 60/879,737, filed on Jan. 10, 2007.

(51) Int. Cl.
*G06K 9/36* (2006.01)
*G06T 5/00* (2006.01)

(52) U.S. Cl. ........................ 382/275; 382/284

(58) Field of Classification Search .............. 382/167, 382/117, 254, 284, 275
See application file for complete search history.

(56) References Cited

U.S. PATENT DOCUMENTS

| 5,130,789 | A | 7/1992 | Dobbs et al. |
| 6,631,208 | B1* | 10/2003 | Kinjo et al. ................. 382/167 |
| 2002/0126893 | A1 | 9/2002 | Held et al. |
| 2005/0238230 | A1* | 10/2005 | Yoshida ..................... 382/167 |
| 2006/0029262 | A1* | 2/2006 | Fujimatsu et al. .......... 382/117 |
| 2007/0098260 | A1 | 5/2007 | Yen et al. |
| 2007/0189606 | A1* | 8/2007 | Ciuc et al. ................. 382/195 |
| 2008/0095445 | A1* | 4/2008 | Brandt ..................... 382/203 |

FOREIGN PATENT DOCUMENTS

JP   2004242272   8/2004

* cited by examiner

*Primary Examiner* — Jon Chang
(74) *Attorney, Agent, or Firm* — Raymond L. Owens

(57) ABSTRACT

Correction of color defects in a pupil represented in a digital image is disclosed. For example, a location in the pupil within the digital image is identified, and a target color to be corrected is computed based at least upon an analysis of pixels within a first region in which the location resides. Defect pixels in a second region in which the location resides are identified, the defect pixels being identified as having a pixel color similar to the target color. The defect pixels are color-corrected. For pupils that appear all white, appropriately configured pupil images are inserted therein.

2 Claims, 4 Drawing Sheets

PET EYE CORRECTION

CROSS-REFERENCE TO RELATED APPLICATIONS

This application is a divisional of U.S. Ser. No. 11/971,988 filed Jan. 10, 2008, now abandoned entitled "Pet Eye Correction", which claimed the benefit of U.S. Provisional Application No. 60/879,737, filed Jan. 10, 2007, the entire disclosures of which are hereby incorporated herein by reference.

FIELD OF THE INVENTION

The invention relates to digital image corrections and more particularly relates to pupil color-corrections.

BACKGROUND

Animals, such as pets, often have the equivalent of human red eye in pictures, hereafter also referred to as "pet eye," but with different colors. Although the phrases red eye and pet eye include the term "eye", the discoloration from the red eye and pet eye conditions actually occurs in the pupils of humans and animals, respectively. Accordingly, the term "eye" in this art often is intended to refer to "pupil," as opposed to an entire eye. For example, a digital image of a dog may represent the dog's pupils as being green in color. In addition, sometimes even the two pupils of an animal have different colors. Conventional human red eye correction procedures that rely upon detecting pixels of a red color, however, are not useful for correcting these pet eye conditions. Another pet eye condition is referred to as a white eye or cue ball condition. In this case the entire pupil appears white or light in color similar to the color of a glint.

It would thus be desirable to provide a solution or improved solution for overcoming or mitigating these pet eye conditions.

SUMMARY

Systems and methods for correcting color defects in a pupil represented in a digital image are disclosed. According to some embodiments of the present invention, a location in the pupil within the digital image is identified, and a target color to be corrected is computed based at least upon an analysis of pixels within a first region in which the location resides. Defect pixels in a second region in which the location resides are identified, the defect pixels being identified as having a pixel color similar to the target color. The defect pixels are color-corrected. By computing a target color, from which the defect pixels are identified and color-corrected, any pupil discoloration color can be corrected, including human red eye and the various other colors that show up in pet eye conditions. In addition, a single process may be used to correct both human red eye and pet eye conditions.

According to some embodiments of the present invention, for a pupil that appears all white, a presumed pupil region is identified, and an appropriately configured pupil image is inserted into the pupil region.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION

Embodiments of the present invention facilitate the color-correction of pupils regardless of the particular color of discoloration present in the pupil in a digital image. Accordingly, such embodiments are useful for, among other things, correcting human red eye conditions, pet eye conditions, or both.

It should be noted that the invention is inclusive of combinations of the embodiments described herein. References to a particular embodiment and the like refer to features that are present in at least one embodiment of the invention. Separate references to an embodiment or particular embodiments or the like do not necessarily refer to the same embodiment or embodiments; however, such embodiments are not mutually exclusive, unless otherwise explicitly noted or required by context. The use of singular or plural in referring to the "method" or "methods", "system" or "systems", and the like is not limiting. Further, it should be noted that, unless otherwise explicitly noted or required by context, the word "or" is used in this disclosure in a non-exclusive sense.

Figure 1:
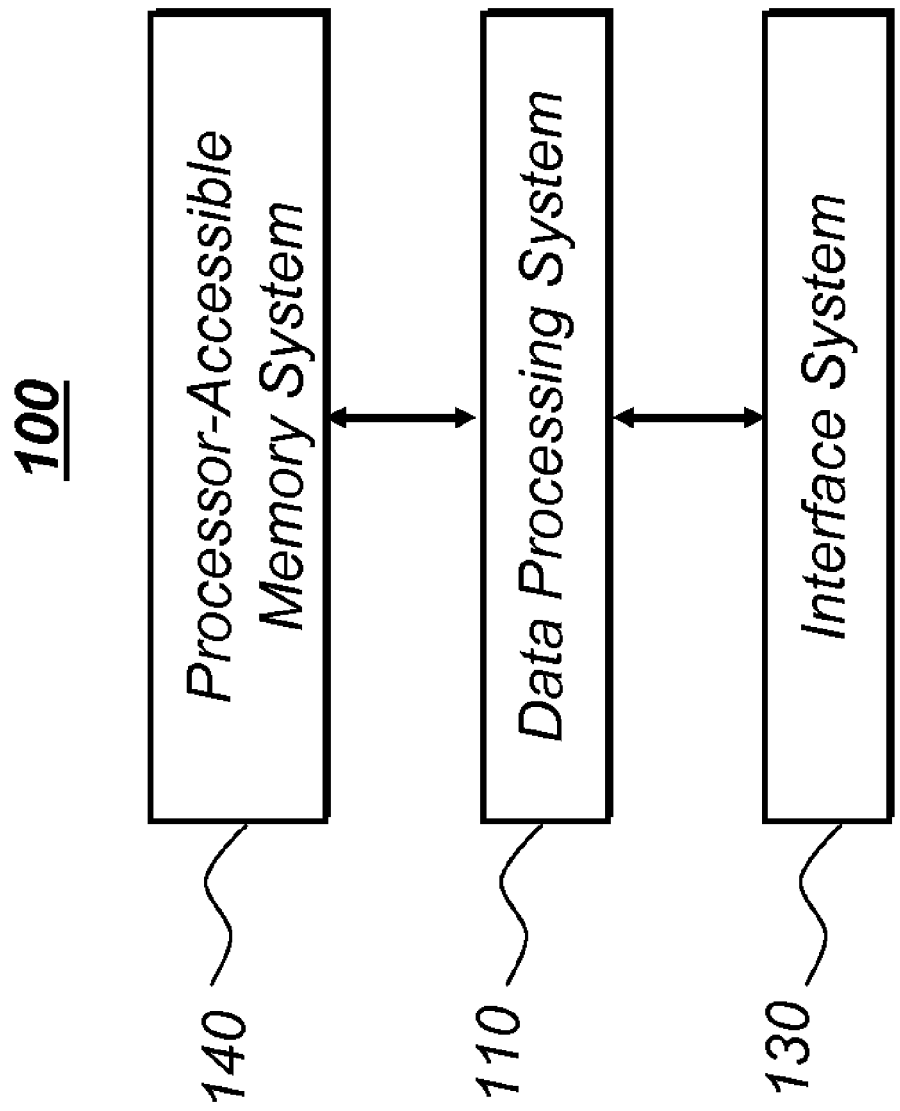
FIG. 1 illustrates a system for correcting color defects in a pupil represented in a digital image, according to an embodiment of the present invention.

FIG. 1 illustrates a system 100 for correcting color defects in a pupil represented in a digital image, according to an embodiment of the present invention. The system 100 includes a data processing system 110, an interface system 130, and a processor-accessible memory system 140. The processor-accessible memory system 140 and the interface system 130 are communicatively connected to the data processing system 110.

Figure 2:
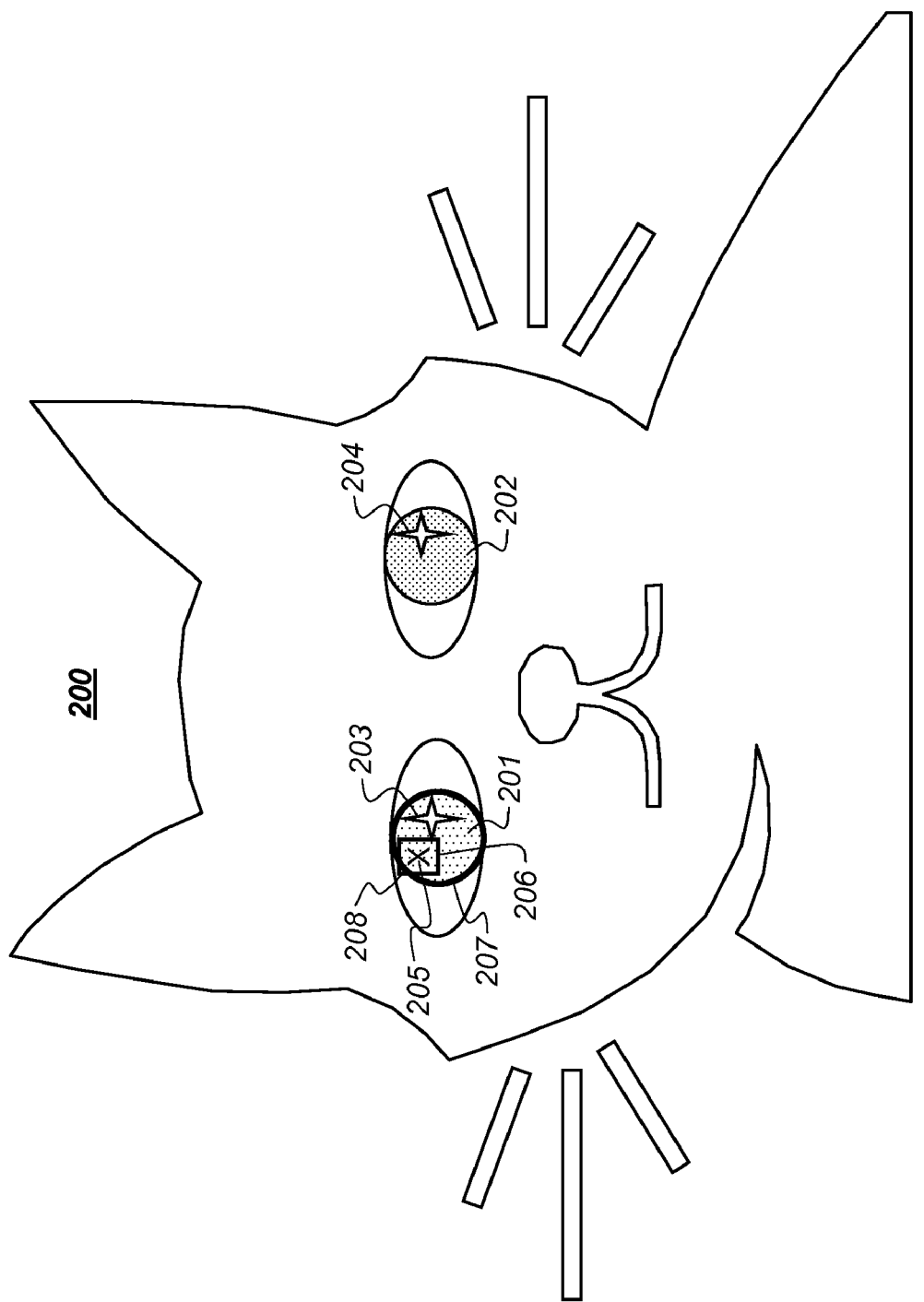
FIG. 2 illustrates a method for correcting color defects in a pupil represented in a digital image, according to an embodiment of the present invention.
Figure 3:
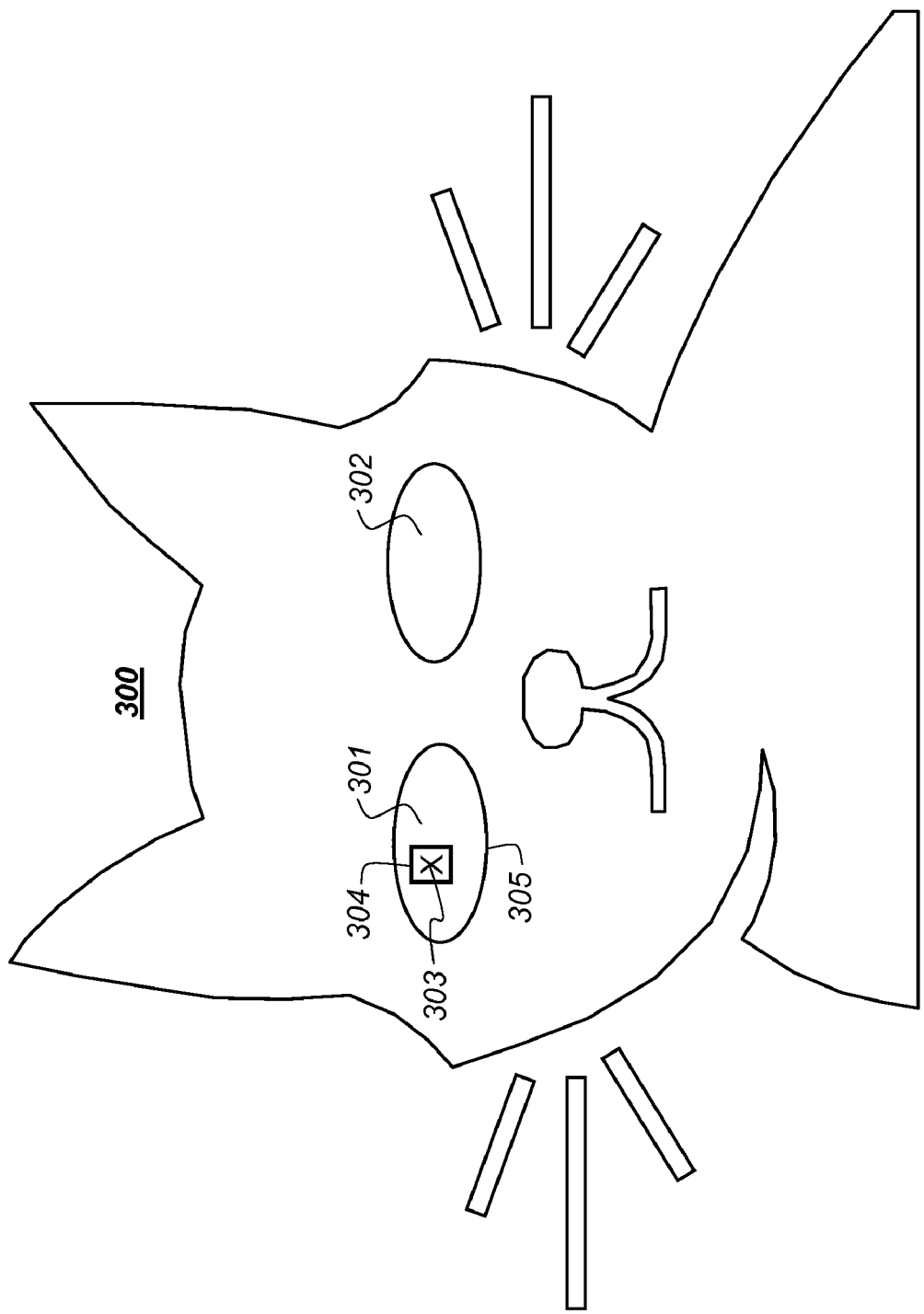
FIGS. 3 and 4 illustrate a method for correcting color defects in a pupil represented in a digital image at least by replacing the pupil region with an image of a pupil, according to an embodiment of the present invention.
Figure 4:
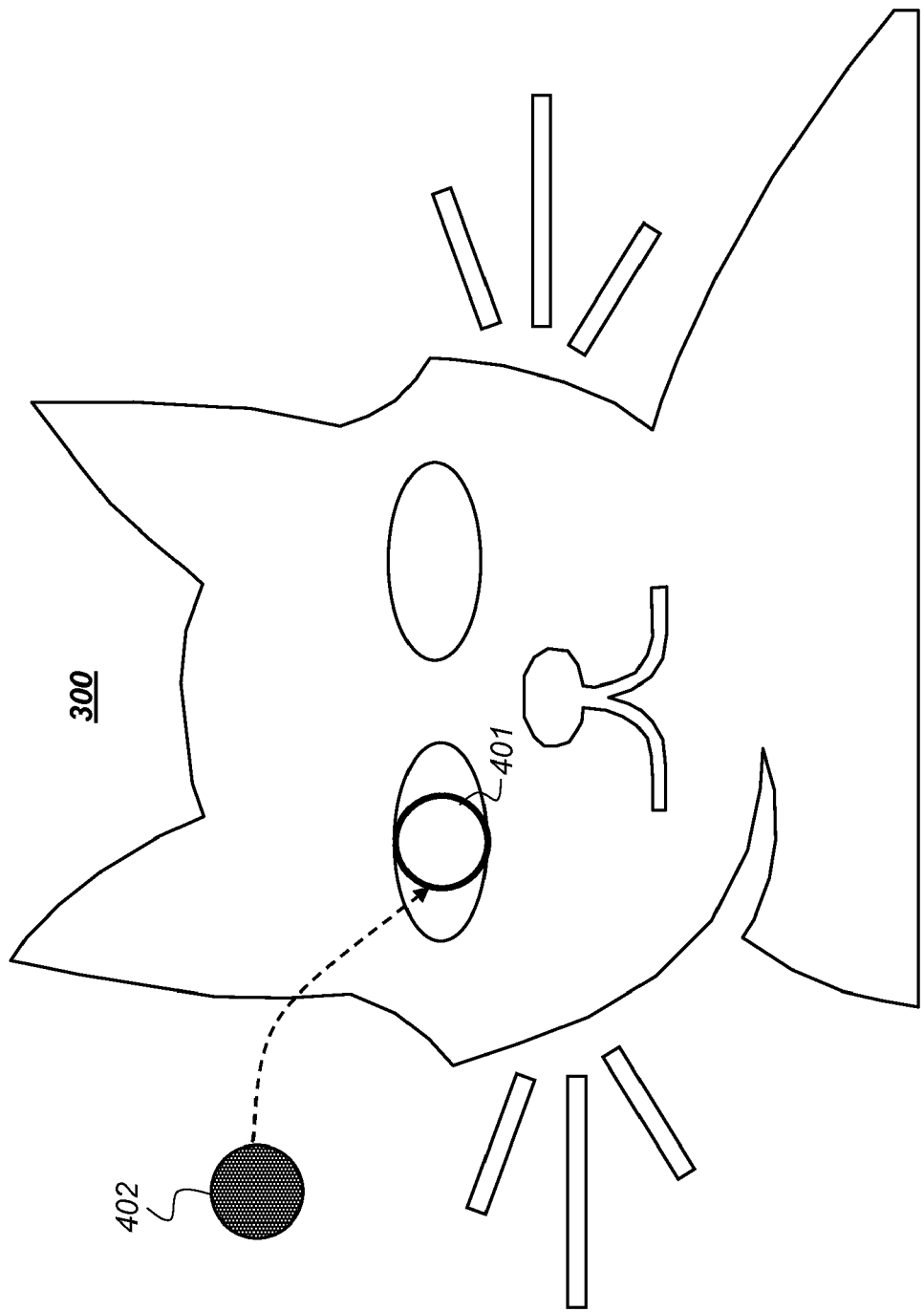

The data processing system 110 includes one or more data processing devices that implement the processes of the various embodiments of the present invention, including the processes illustrated by FIGS. 2-4. The phrases "data processing device", "data processor", or "processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention, including the processes illustrated by FIGS. 2-4. The processor-accessible memory system 140 may be a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 may be stored completely or partially within the data processing system 110. Further in this regard, although the interface system 130 is shown separately from the data processing system 110, one skilled in the art will appreciate that the interface system 130 may be located completely or partially within the data processing system 110.

The interface system 130 may include a mouse, a keyboard, another data processor, or any device or combination of devices from which data is input to the data processing system 110. The interface system 130 also may include a display device, a processor-accessible memory, or any device or combination of devices to which data is output by the data processing system 110. In this regard, if the interface system 130 includes a processor-accessible memory or memory system, such memory or memory system may be part of the processor-accessible memory system 140 even though the interface system 130 and the processor-accessible memory system 140 are shown separately in FIG. 1.

FIG. 2 illustrates a method for correcting color defects in a pupil represented in a digital image, according to an embodiment of the present invention. In this regard, FIG. 2 represents a digital image 200 of a pet, in this case, a cat. In this example, the digital image 200 represents two pupils (or pupil regions) 201, 202 of the cat that have been discolored during the process of acquiring the digital image 200. Such discoloring is represented in FIG. 2 by the dot-shaded regions in the pupils 201, 202. Each pupil 201, 202 has a different amount of dot-shading, indicating that each pupil 201, 202 may be discolored differently. Pupil discoloration often is caused by the firing of a light flash by the digital image-acquisition device that captured the digital image 200. Also often caused by such firing of a light flash are specular highlights 203, 204 (also referred to as glint) in pupils 201, 202, respectively. Specular highlights 203, 204 are represented in FIG. 2 as 4-point stars for illustration purposes. However, one of ordinary skill in the art will appreciate that specular highlights may take other shapes in a pupil represented in a digital image.

In order to correct the discoloration in a pupil, according to an embodiment of the present invention, a location within the pupil is identified. In the example of FIG. 2, the discoloration in the pupil 201 is being corrected, and the identified location within the pupil 201 is marked by the "X" 205. Although pupil 201 is being corrected in the example of FIG. 2, one of ordinary skill in the art will appreciate that pupil 202 may be corrected in the same manner as pupil 201. Also, the location 205 is shown merely for illustration purposes, and one of ordinary skill in the art will appreciate that location 205 may be any place where pupil discoloration is located or substantially adjacently located.

Location 205 in the discolored pupil 201 may be identified based at least upon user input. Alternatively, location 205 may be identified based at least upon a data-processor-executed search for a pupil that exhibits expected discoloration attributes using techniques known in the art.

Upon identification of a location in a discolored pupil, a target color to be corrected may be computed based at least upon an analysis of pixels within a first region of pixels in which the identified location resides. In the example of FIG. 2, the first region is shown as rectangle 206. The first region may be a local neighborhood of pixels, such as a 3×3 neighborhood, a 3×4 neighborhood, a 5×5 neighborhood, etc. Alternatively, the first region may merely include only a single pixel at which the identified location (e.g., 205) resides. Alternatively still, the first region may include the entire region of pupil discoloration (dot-shaded region 201, e.g.). Accordingly, one skilled in the art will appreciate that the invention is not limited to any particular choice of the size and shape of the first region, so long as the first region includes the identified location (e.g., 205) and is not too large so as to substantially skew a proper determination of the target color, as discussed below.

The target color aims to accurately represent the color of the discoloration present in the respective pupil (e.g., 201). Accordingly, the target color may be computed in any manner that sufficiently identifies the color of the discoloration to be corrected, such as by analyzing the pixels in a first region in which the identified location (205, e.g.) resides. Such an analysis may include determining an average of pixel color values of at least some of the pixels within the first region. However, one skilled in the art will appreciate that other statistical or mathematical analyses may be performed.

To facilitate a proper identification of the target color, some embodiments of the present invention exclude pixels representing specular highlights in the analysis of the pixels in the first region. Because specular highlights (203, e.g.) are extremely bright, they may unduly skew the target color towards brighter colors when present in the first region. Similarly, to the extent that the first region (205, e.g.) includes other non-uniformities, such as uncharacteristically dark or uncharacteristically different colors, such other non-uniformities also may be excluded. In the example of FIG. 2, the first region 206 includes a corner region 208 outside of the pupil 201. Consequently, corner region 208 may include pixels that exhibit substantially different color characteristics than many or most of the other pixels within the first region 206. Accordingly, the corner region 208 also may be excluded in the analysis of pixels in the first region 206 when computing the target color.

After determining the target color, defect pixels may be identified in a second region in which the identified location (205, e.g.) resides. The defect pixels are the pixels that ultimately undergo color correction. In the example of FIG. 2, the second region is represented by circle 207, which includes the entire pupil 201. One of ordinary skill in the art, however, will appreciate that the second region may include less than all of an entire pupil being corrected, such as, for example, a region or regions in or around the pupil that have a significant probability of needing correction. Also, one of ordinary skill in the art will appreciate that the second region may be the same as the first region, or that the second region may entirely include the first region. However, as shown in FIG. 2, not all of the first region (corner region 208 of first region 206, e.g.) needs to be within the second region (207, e.g.). In addition, although the second region 207 in FIG. 2 is shown to be a circle for illustration purposes only, one skilled in the art will appreciate that the second region, as well as pupils, may have other shapes, such as ellipses.

According to an embodiment of the present invention, the defect pixels may be identified as those pixels within the second region exhibiting a difference in color with respect to the target color within a threshold. In other words, the defect pixels may be identified as those pixels that have a color close to the target color, where the threshold determines the required amount of closeness. In this regard, pixels representing specular highlights may be excluded as defect pixels, so that they remain uncorrected. Similarly, other pixels exhibiting large differences in color from the target color may be excluded as defect pixels, so that they too remain uncorrected. A threshold used for identifying defect pixels may be user-defined and may be user-adjustable.

After identifying the defect pixels, color correction may be performed on the defect pixels. According to an embodiment of the present invention, the defect pixels are modified so that they are more neutral in color. Or, the defect pixels may be modified so that they are neutral or substantially neutral in color. In some embodiments, each defect pixel is corrected to have red, green, and blue color values equal to a minimum of the corresponding defect pixel's pre-corrected red, green, and blue color values. For example, if a defect pixel, prior to correction, exhibits red, green, and blue color values of 15, 10, and 180, respectively, the defect pixel may be corrected so that its red, green, and blue color values are 10, 10, and 10, respectively.

After color-correcting the defect pixels, an optional blending step may be performed, where pixels in a third region in which the second region resides are blended. This optional blending step facilitates a more natural appearance of the color-corrected defect pixels within the context of the rest of the digital image (200, e.g.). The third region may be the same as the second region. This is true in the example of FIG. 2, where the third region is the same as the second region 207 and, consequently, is not explicitly shown. Alternatively, the third region may be somewhat larger than the second region. For example, if a kernel, such as a 5×5 pixel kernel, is used to blend pixels, the kernel may be used to cause blending in pixels slightly outside and around the border of the second region.

FIGS. 3 and 4 illustrate a method for correcting color defects in a pupil represented in a digital image at least by replacing a presumed pupil region with an image of a pupil, according to an embodiment of the present invention. This and related embodiments are useful for correcting a pupil that appears all or substantially all white. This is a condition referred to as a 'cue ball.' Pupils exhibiting a cue ball condition appear to be missing their pupils. The cue ball condition often occurs in pet pupils, but one skilled in the art will appreciate that the following procedure may be used for any pupil experiencing the cue ball condition.

The example of FIGS. 3 and 4 is similar to the example of FIG. 2 in that it represents a digital image 300 of a cat. In this example, however, the cat includes two pupils 301, 302 that are experiencing the cue ball condition. In order to correct the cue ball condition in a pupil, according to an embodiment of the present invention, an expected pupil-location is identified. In the example of FIG. 3, the cue ball condition in the pupil 301 is being corrected, and the expected pupil-location is marked by the "X" 303. Although pupil 301 is being corrected in the example of FIG. 3, one of ordinary skill in the art will appreciate that pupil 302 may be corrected in the same manner as pupil 301. Also, the location 303 is shown merely for illustration purposes, and one of ordinary skill in the art will appreciate that location 303 may be anywhere in or substantially adjacent where the pupil 301 was expected to be located.

Location 303 may be identified based at least upon user input. Alternatively, location 303 may be identified based at least upon a data-processor-executed search for an expected pupil-location in an eye using techniques known in the art.

Upon identification of an expected pupil-location, it is determined whether all or substantially all of the pixels within a particular region have a white or a substantially white color. This step determines whether a cue ball condition exists in the pupil. The particular region may include the expected pupil-location. In the example of FIG. 3, the particular region is shown as rectangle 304. The particular region may be a local neighborhood of pixels, such as a 3×3 neighborhood, a 3×4 neighborhood, a 5×5 neighborhood, etc. Alternatively, the particular region may include the entire eye being evaluated (305, e.g.). Accordingly, one skilled in the art will appreciate that the invention is not limited to any particular choice of the size and shape of the particular region, so long as the particular region includes the expected pupil-location (303, e.g.) and is not too large so as to substantially skew a proper determination of the cue ball condition.

If it is determined that all or substantially all of the pixels within the particular region (304, e.g.) have a white or substantially white color, then a presumed pupil region is identified. In the example of FIG. 4, the presumed pupil region is identified by circle 401. Although the presumed pupil region in FIG. 4 is shown as a circle for purposes of clarity, one skilled in the art will appreciate that cats and other animals have differently shaped pupils and that the invention is not limited to any particularly shaped pupil. The presumed pupil region (401, e.g.) may be identified based at least upon an analysis of the type of animal or person whose pupil is being corrected, as well as the relative size and shape of the pupil being corrected (301, e.g.).

Once the presumed pupil region (401, e.g.) has been identified, an image of a pupil appropriate (402, e.g.) for the animal or person whose pupil is being corrected is identified. Such pupil image is appropriately scaled and then inserted into the presumed pupil region to facilitate correcting the cue ball condition. According to some embodiments, an image of an iris also may be included with the pupil image inserted into the presumed pupil region.

It is to be understood that the exemplary embodiments are merely illustrative of the present invention and that many variations of the above-described embodiments can be devised by one skilled in the art without departing from the scope of the invention. For example, although the examples of FIGS. 2-4 pertain to correcting discolored pupils of a cat, one skilled in the art will appreciate that the foregoing processes also may be used to correct discolored pupils of other animals, as well as humans. It is therefore intended that all such variations be included within the scope of the following claims and their equivalents.

The invention claimed is:

1. A method implemented at least in part by a computer system, the method for correcting color defects in a pupil represented in a digital image, and the method comprising the steps of:

identifying an expected pupil-location within the digital image;

determining that all or substantially all of the pixels within a particular region in which the expected pupil-location resides have a white or a substantially white color;

identifying a presumed pupil region; and inserting into the presumed pupil region an image of a pupil configured to fit the presumed pupil region when all or substantially all of the pixels within a particular region in which the expected pupil-location resides have a white or a substantially white color.

2. The method of claim 1, wherein the image of the pupil includes an image of an iris.

* * * * *